(12) United States Patent
Wescott et al.

(10) Patent No.: US 7,561,784 B2
(45) Date of Patent: Jul. 14, 2009

(54) GIMBAL SYSTEM

(75) Inventors: Timothy A. Wescott, Oregon City, OR (US); Gregory D. Dent, Hillsboro, OR (US); James H. Weaver, West Linn, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 171 days.

(21) Appl. No.: 10/956,738

(22) Filed: Oct. 1, 2004

(65) Prior Publication Data

US 2006/0071121 A1    Apr. 6, 2006

(51) Int. Cl.
  *G03B 39/00*    (2006.01)
(52) U.S. Cl. .................... 396/13; 396/428; 396/12; 248/274.1; 248/660; 248/184.1; 248/550; 248/637
(58) Field of Classification Search ............. 248/274.1, 248/660, 184.1, 550, 637; 396/428, 12, 13
  See application file for complete search history.

(56) References Cited

U.S. PATENT DOCUMENTS

| | | | |
|---|---|---|---|
| 1,236,722 A | | 8/1917 | Lange |
| 1,812,833 A | | 6/1931 | Schaefer |
| 2,552,940 A | | 5/1951 | Cornut |
| 2,945,414 A | * | 7/1960 | Blackstone ............... 348/146 |
| 3,012,440 A | | 12/1961 | Thierman |
| 3,085,354 A | * | 4/1963 | Rasmussen et al. ............ 434/31 |
| 3,128,982 A | | 4/1964 | Christopher |
| 3,638,502 A | * | 2/1972 | Leavitt et al. .............. 74/5.34 |
| 3,765,631 A | * | 10/1973 | Herbst et al. ............... 248/583 |
| 4,044,364 A | * | 8/1977 | Prinzo ..................... 396/428 |
| 4,155,521 A | | 5/1979 | Evans et al. |
| 4,195,903 A | | 4/1980 | Kawase et al. |
| 4,218,702 A | * | 8/1980 | Brocard et al. .............. 348/144 |
| 4,961,636 A | | 10/1990 | Gaul et al. |
| 4,989,466 A | * | 2/1991 | Goodman ................... 74/5.22 |
| 5,034,759 A | * | 7/1991 | Watson ....................... 396/7 |
| 5,077,465 A | | 12/1991 | Wagner et al. |
| 5,121,220 A | | 6/1992 | Nakamoto |
| 5,279,479 A | | 1/1994 | Adama et al. |
| 5,372,333 A | | 12/1994 | Uwira et al. |
| 5,383,645 A | * | 1/1995 | Pedut et al. ................ 248/637 |
| 5,515,206 A | | 5/1996 | Peng |
| 5,527,003 A | | 6/1996 | Diesel et al. |
| 5,528,416 A | | 6/1996 | Hartmann |
| 5,548,442 A | | 8/1996 | Devenyi et al. |

(Continued)

OTHER PUBLICATIONS

Copenheaver, Blaine R., Authorized officer, International Searching Authority, International Search Report for PCT Application No. PCT/US07/04228; search date: May 5, 2208.

(Continued)

*Primary Examiner*—J. Allen Shriver, II
*Assistant Examiner*—Michael McDuffie
(74) *Attorney, Agent, or Firm*—Kolisch Hartwell, PC

(57) ABSTRACT

A gimbal system. The gimbal system may include space-saving features configured to accommodate one or more payload components, thus increasing the payload capacity of the gimbal ball without necessarily increasing the outer dimensions of the gimbal ball. Alternatively, or in addition, the gimbal system may include a motor configured to move at least one gimbal relative to another gimbal about a first axis, with the motor peripherally mounted distal the axis.

8 Claims, 6 Drawing Sheets

U.S. PATENT DOCUMENTS

| | | | |
|---|---|---|---|
| 5,726,814 | A | 3/1998 | Lidwell |
| 5,831,762 | A | 11/1998 | Baker et al. |
| 5,897,223 | A * | 4/1999 | Tritchew et al. ............... 396/13 |
| 5,907,433 | A | 5/1999 | Voigt et al. |
| 5,953,155 | A | 9/1999 | Eckel, Jr. et al. |
| 5,954,310 | A * | 9/1999 | Soldo et al. ................. 248/660 |
| 5,967,458 | A | 10/1999 | Williams et al. |
| 6,145,393 | A * | 11/2000 | Canton ....................... 74/5.43 |
| 6,154,317 | A * | 11/2000 | Segerstrom et al. ......... 359/554 |
| 6,175,807 | B1 | 1/2001 | Buchler et al. |
| 6,181,988 | B1 | 1/2001 | Schneider et al. |
| 6,271,975 | B1 | 8/2001 | Grupp |
| 6,354,749 | B1 * | 3/2002 | Pfaffenberger, II .......... 396/427 |
| 6,396,235 | B1 | 5/2002 | Ellington et al. |
| 6,422,508 | B1 | 7/2002 | Barnes |
| 6,454,229 | B1 * | 9/2002 | Voigt et al. ............... 248/182.1 |
| 6,708,943 | B2 | 3/2004 | Ursan et al. |
| 6,764,051 | B2 * | 7/2004 | Knight ....................... 248/128 |
| 7,023,615 | B1 | 4/2006 | Voigt et al. |
| 7,264,220 | B2 | 9/2007 | Dent et al. |
| 7,471,451 | B2 | 12/2008 | Dent et al. |
| 2007/0086087 | A1 | 4/2007 | Dent et al. |
| 2007/0194170 | A1 | 8/2007 | Ellison et al. |

OTHER PUBLICATIONS

"Inertial Measurement Units," no author listed, no date listed, article was last updated on Apr. 7, 2002 <http://spaceflight.nasa.gov/shuttle/reference/shutref/orbiter/avionics/gnc/imu.html>.

* cited by examiner

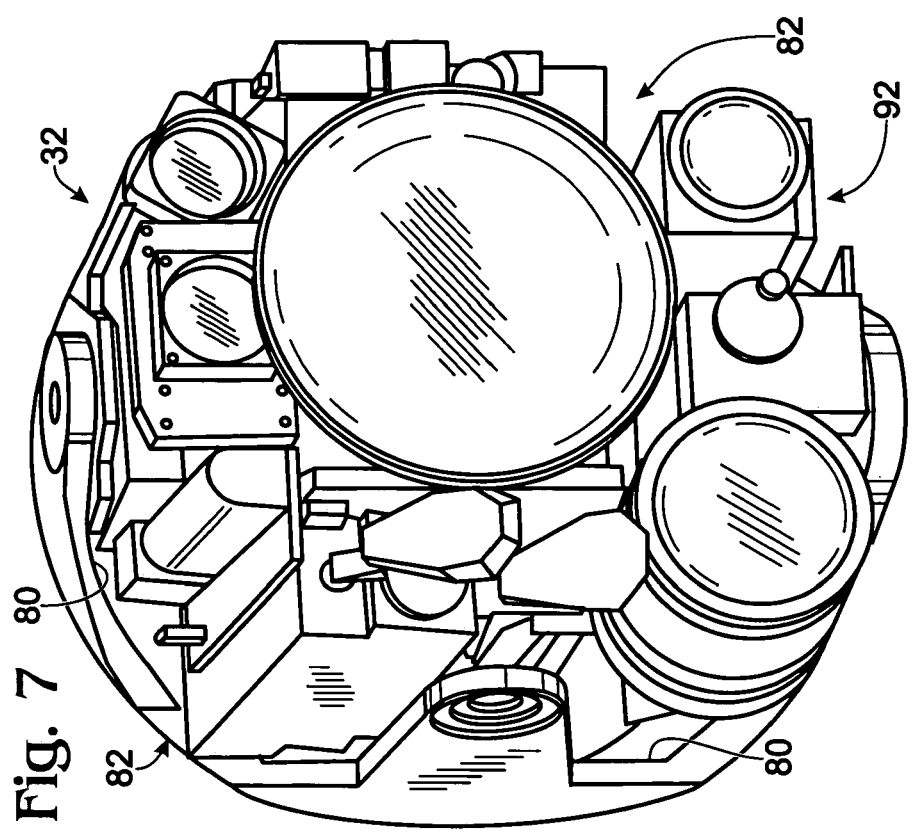
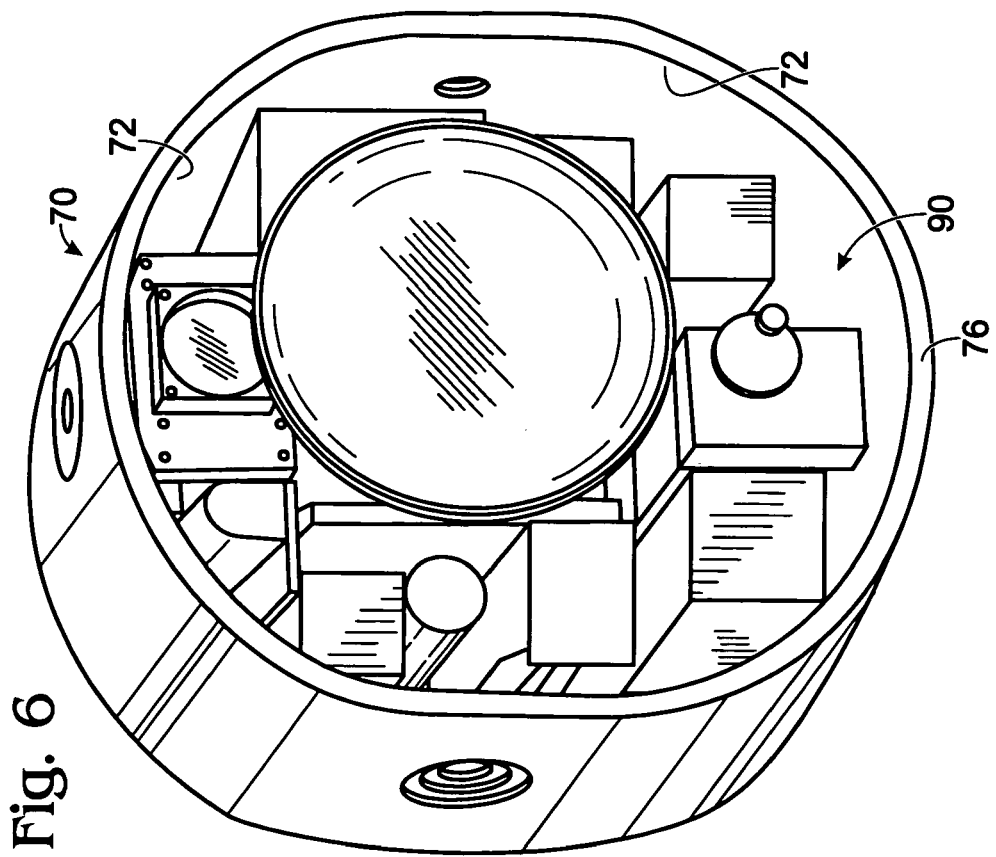

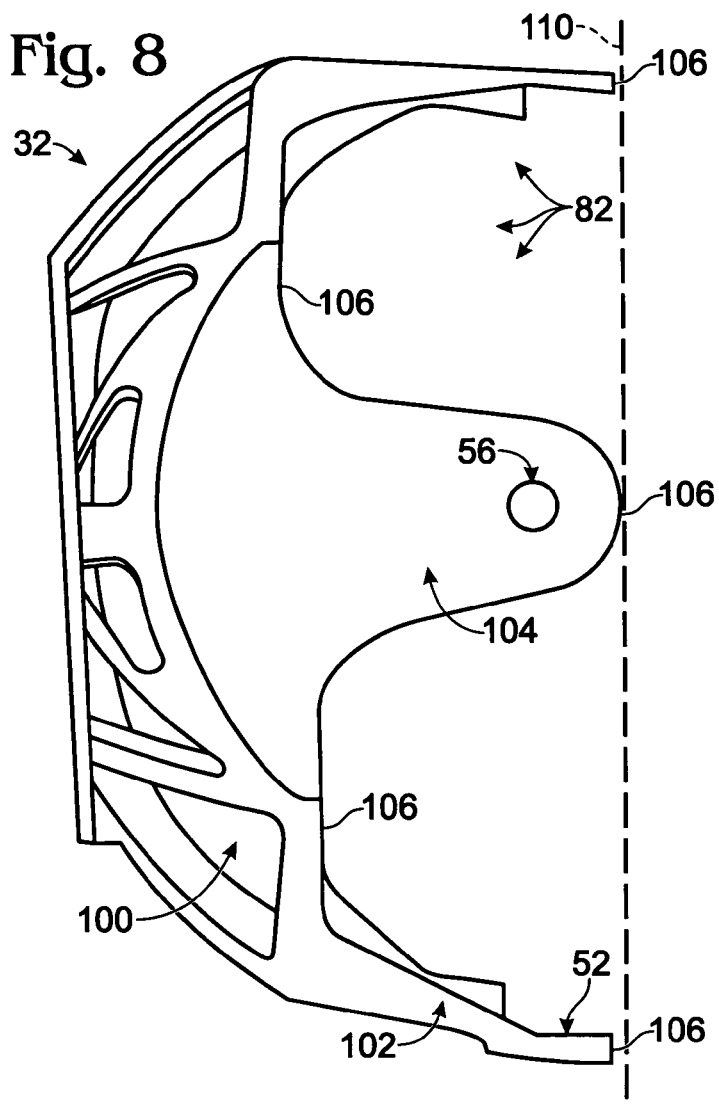
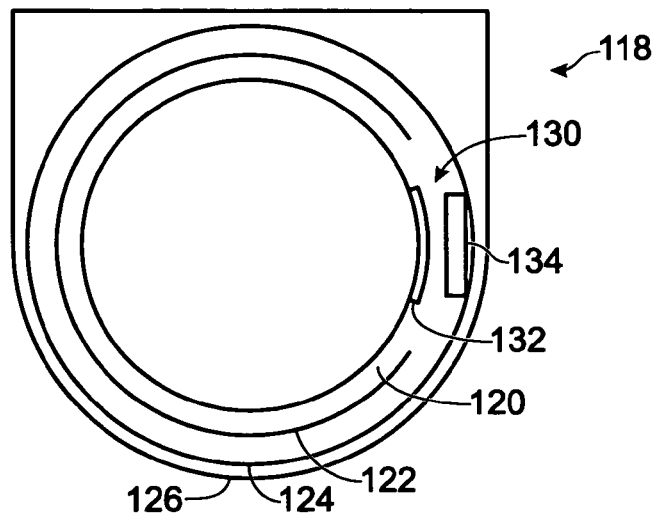

GIMBAL SYSTEM

CROSS-REFERENCE TO RELATED APPLICATION

This application incorporates by reference in its entirety for all purposes U.S. patent application Ser. No. 10/956,739, filed Oct. 1, 2004.

BACKGROUND

Cameras, infrared sensors, compasses, weapons, and other devices can be mounted and used on a variety of supports. For example, moving vehicles, including various aircraft, watercraft, and ground vehicles, can provide versatile supports capable of transporting such devices. Many devices benefit from being easily and accurately pointed at a desired target. Gimbal systems can be used alone, or with gyroscopic stabilization, easily and accurately to point such devices without necessarily having to reorient the supports to which the devices are mounted.

Gimbal balls, as used herein, are any device-mounting mechanisms that include at least two different, typically mutually perpendicular, axes of rotation, thus providing angular movement in at least two directions. A gimbal ball can include one or more constituent gimbals, each of which can rotate relative to one or more other constituent gimbals and/or a supported payload. A gimbal ball also can include corresponding motors for rotating the various gimbals, control systems for controlling the various motors and/or payload components, gyroscopes for stabilizing the payload, as well as any other components used to aim and/or otherwise control the payload.

SUMMARY

The present teachings disclose a gimbal system, including components and methods of use thereof. The gimbal system may include space-saving features configured to accommodate one or more payload components, thus increasing the payload capacity of the gimbal ball without necessarily increasing the outer dimensions of the gimbal ball. Alternatively, or in addition, the gimbal system may include a motor configured to move at least one gimbal relative to another gimbal about a first axis, with the motor peripherally mounted distal the axis.

BRIEF DESCRIPTION OF THE DRAWINGS

FIGS. 6 and 7 respectively show axonometric views of the gimbals of FIGS. 4 and 5.

FIG. 8 is a side-view of the gimbal of FIGS. 5 and 7.

FIG. 9 is a schematic view of an exemplary gimbal ball.

DETAILED DESCRIPTION

Figure 1:
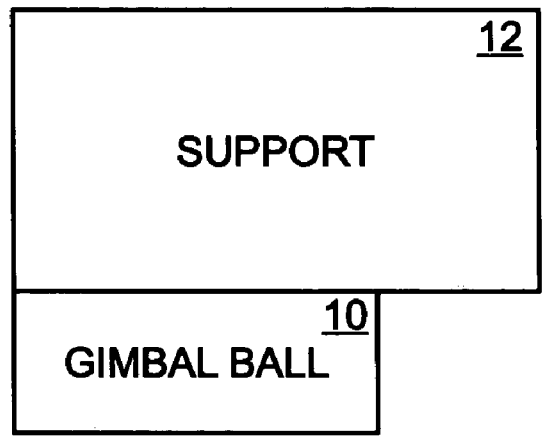
FIG. 1 is a schematic view of a gimbal ball mounted to a support.

FIG. 1 schematically shows an exemplary gimbal ball 10 mounted to an exemplary support 12.

A gimbal ball, as used herein, generally comprises any device-mounting mechanism that includes at least two different axes of rotation, thus providing angular movement in at least two directions. A gimbal ball can be configured to rotate a payload about any suitable or desired number of axes, including two axes, three axes, four axes, five axes, six axes, or even more than six axes. In some embodiments, the axes of rotation may be collinear or coplanar. In some embodiments, at least one axis may be located in a different plane than another axis. The axes of rotation generally are either perpendicular to one another or parallel to one another, although this is not required. Nonparallel axes allow a payload to be aimed two dimensionally, such as up and down as well as side to side. In some embodiments, parallel axes, or substantially parallel axes, can be used to provide increased precision, with a first level of rotation about a first axis providing coarser large-magnitude adjustments and a second level of rotation about a second axis parallel to the first axis providing finer small-magnitude adjustments.

A support, as used herein, generally comprises any mechanism for holding or bearing a gimbal ball. For example, a gimbal ball can be supported by a moving support, such as a helicopter, airplane, glider, dirigible, balloon, drone, boat, car, truck, motorcycle, missile, rocket, or virtually any other vehicle, among others. Alternatively, or in addition, a gimbal ball also can be supported by a stationary support, such as an observation platform or tower, among others. Typically, the support is selected to complement the function of the gimbal ball.

A gimbal ball and support may be connected, joined, or otherwise associated using any suitable mechanism, with any suitable orientation. For example, a gimbal ball may be bottom-mounted, side-mounted, top-mounted, front-mounted, rear-mounted, externally-mounted, internally-mounted, and so on. Moreover, such mounting may be static or dynamic, for example, in the latter case optionally involving additional gimbal(s).

A gimbal ball and/or support can be used for any suitable function. For example, a gimbal ball can be used to point a payload of one or more devices at a desired target or in a desired direction and/or to hold a payload in a substantially fixed orientation as the support to which the gimbal is mounted moves. Consistent with this flexibility, a gimbal ball can include one or more still cameras, motion cameras, visible cameras, infrared cameras, and/or compasses, among others.

Some payload components occupy a relatively large volume. For example, camera lenses can be fairly large when designed to provide magnification and/or work in low-light conditions. Such payload components, individually or collectively, can occupy all of the payload capacity that a gimbal ball provides. Therefore, it is desirable to design gimbal balls with increased payload capacity, so that larger and/or more payload components can be accommodated by a single gimbal ball.

Some payload components also can be relatively massive. As the mass of a payload increases, difficulties with moving and controlling the payload can arise. In particular, as explained below in more detail with reference to an illustrative embodiment, a gimbal ball can include two or more constituent gimbals configured to rotate relative to one another. Such rotation can be effected by a motor configured to apply a torque to one or more of the gimbals. Accordingly, motors that can provide improved (e.g., larger and/or more stable) torque can facilitate reliable aiming of the payload.

Some gimbal balls conform to industry standards that specify the external dimensions of the gimbal ball. For example, before approving a gimbal ball, some regulatory agencies may rigorously test the aerodynamics, weight, and/or other attributes of the design, to help ensure that the ball does not unduly affect the performance of the associated support (e.g., aircraft). In particular, the size, shape, weight, and/or other aspects of an outer expression of a gimbal ball may be tested. Therefore, it is desirable to design gimbal balls with profiles that previously have been approved and/or certified, thus obviating the need to undergo additional testing and/or certification. Furthermore, such gimbal ball designs may be off-the-shelf compatible with a variety of different supports that have been configured to work with an industry-standard design.

Although regulatory considerations may constrain the outer expression of a gimbal ball, and compatibility with various vehicles may constrain the connection interface between the gimbal ball and the support, once a particular design has been approved and/or certified, the inner workings of a design can be customized without affecting the exterior expression or interface compatibility. In particular, as described in detail below, a gimbal ball can be configured to enhance payload capacity and payload control without changing an outer expression of the gimbal ball.

The following examples further describe selected aspects and embodiments of the present teachings. These aspects and embodiments include space-saving features configured to accommodate one or more payload components, thus increasing the payload capacity of the gimbal ball without necessarily increasing the outer dimensions of the gimbal ball. These aspects and embodiments also include a motor configured to move at least one gimbal relative to another gimbal about a first axis, with the motor peripherally mounted distal the axis. These examples and the various features and aspects thereof are included for illustration and are not intended to define or limit the entire scope of the disclosure.

EXAMPLE 1

Exemplary Gimbal Ball and Support System

Figure 2:
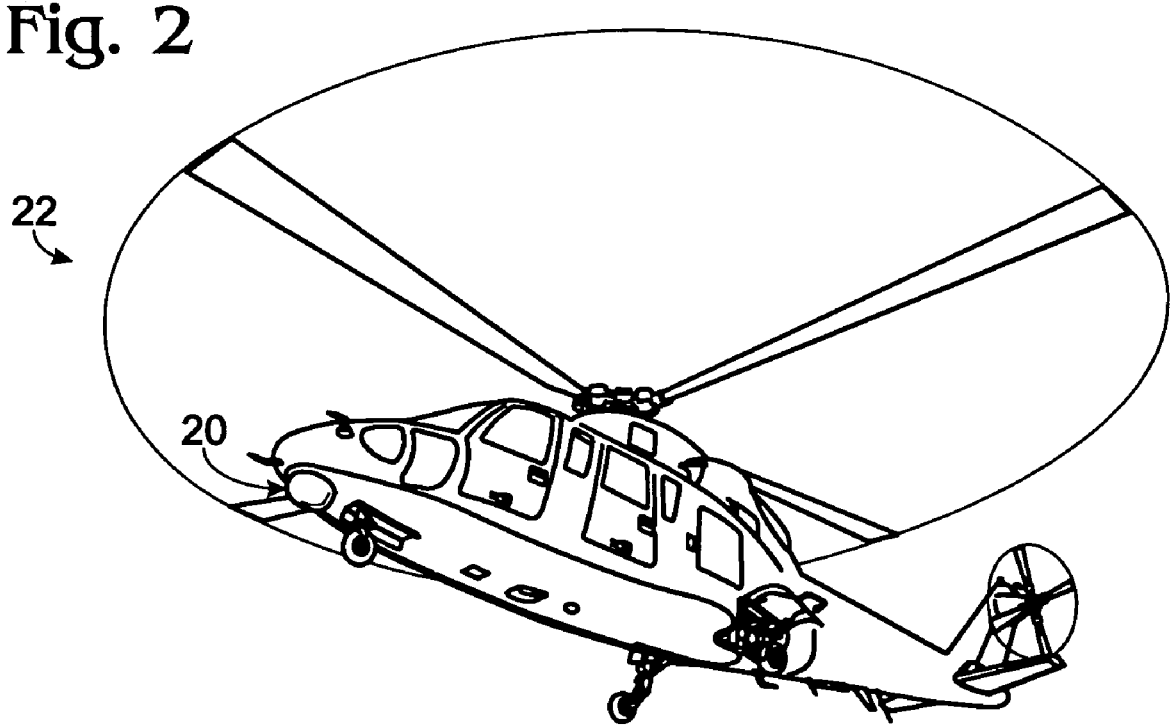
FIG. 2 is an axonometric view of an exemplary gimbal ball (containing a camera payload) mounted to an exemplary support (i.e., a helicopter).

This example describes an exemplary gimbal ball and support system. Specifically, FIG. 2 shows an exemplary gimbal ball 20 mounted on the bottom front of an exemplary support, helicopter 22. The exemplary gimbal ball can include cameras, such as visible and/or infrared cameras, and/or other sensing devices, for use in airborne surveying, reconnaissance, and/or targeting, among others. The gimbal ball also can include additional components, such as drivers and/or gyroscopes, among others, for effecting desired motions and/or resisting undesired motions, respectively.

EXAMPLE 2

Exemplary Gimbal Ball

Figure 3:
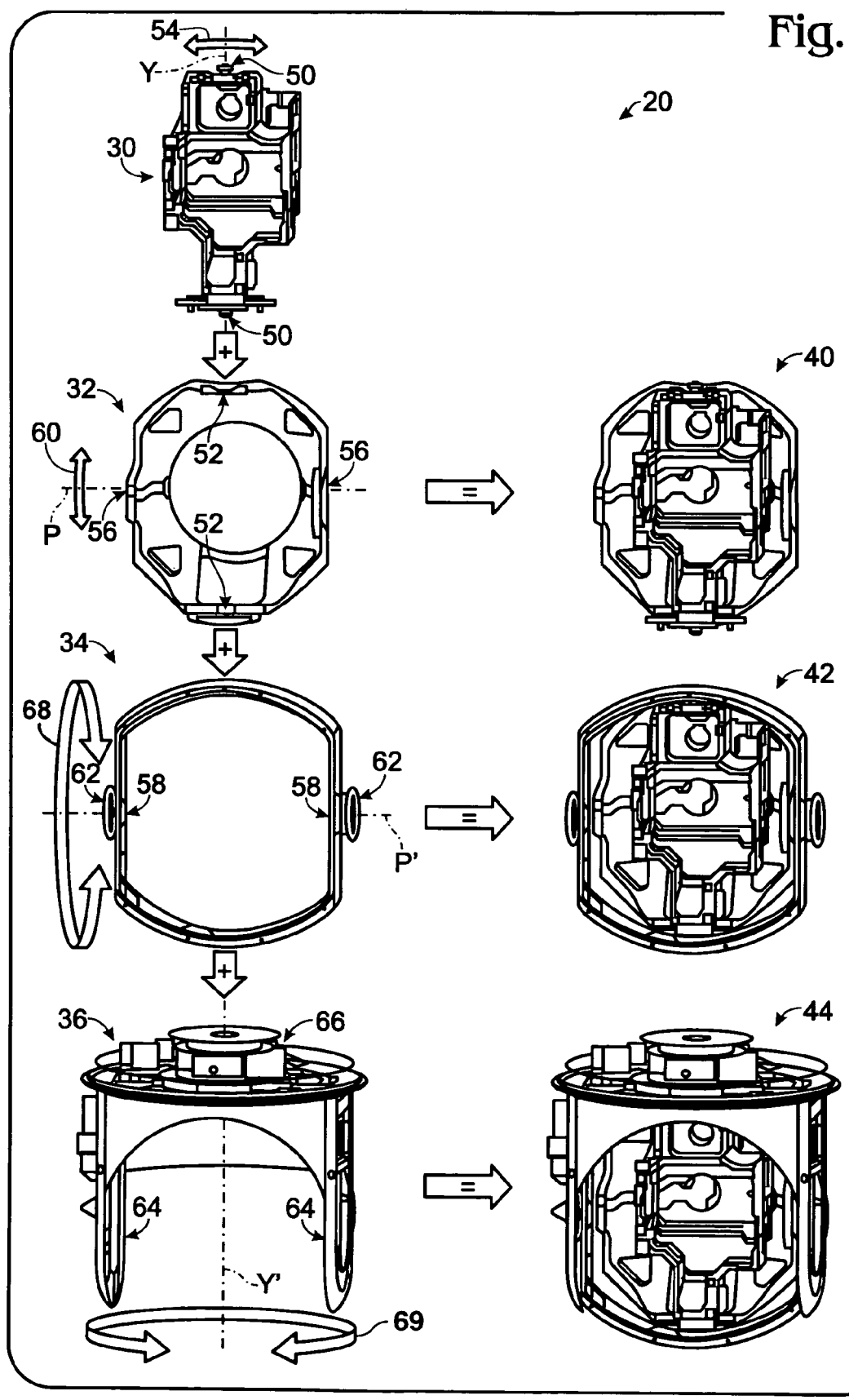
FIG. 3 shows the various gimbals of an exemplary gimbal ball.

This example describes an exemplary gimbal ball 20, including the location and interactions of various constituent gimbals; see FIG. 3. This exemplary gimbal ball could be used with a helicopter and/or other aircraft, among others, for example, as shown in FIG. 2.

FIG. 3 shows exploded views of portions of gimbal ball 20. In particular, FIG. 3 shows a plurality of exemplary gimbals that can cooperate to support and point or otherwise orient a payload. The left column of FIG. 3 shows various gimbals associated with gimbal ball 20, including a minor-yaw gimbal 30, a minor-pitch gimbal 32, a major-pitch gimbal 34, and a major-yaw gimbal 36. Minor-pitch gimbal 32, in particular, includes space-saving features configured to increase payload capacity, as described below. The right column of FIG. 3 shows the gimbals of the left column assembled together. In particular, assembly 40 includes minor-yaw gimbal 30 mounted within minor-pitch gimbal 32; assembly 42 includes assembly 40 mounted within major-pitch gimbal 34; and assembly 44 includes assembly 42 mounted within major-yaw gimbal 36. Gimbal ball 20 also can include a payload, gyroscopes, cover, various motors, and/or control circuitry, among others. The gimbals have been illustrated here without such corresponding elements for simplicity and clarity.

Gimbal ball 20 is provided as a nonlimiting example of a gimbal ball that can be used to point a payload of one or more devices at a desired target or in a desired direction and/or to hold a payload in a substantially fixed orientation, particularly as the support to which the gimbal is mounted moves. One or more gimbals of the ball, including all gimbals of the ball, can be modified while remaining within the scope of this disclosure. Moreover, in some cases, one or more gimbals of the ball can be moved (translationally and/or reorientationally), fixed, or removed.

In the illustrated embodiment, minor-yaw gimbal 30 provides a stage, or inner-mount, to which one or more devices may be mounted. For example, a payload including one or more cameras or other instruments can be mounted to gimbal 30. Exemplary gimbal 30 is provided as a nonlimiting example of a mount to which payload components may be mounted. In some embodiments, such a gimbal may be configured differently so as to accommodate different payloads. As described below, the various other gimbals can cooperate with gimbal 30 so that the payload can be pointed and/or maintained in a desired direction. To this end, the gimbals can be configured to rotate relative to one another about two or more different axes. Gimbal 30 is not necessarily the only gimbal to which payload components can be mounted. In some embodiments, one or more payload components may be mounted on a subsequently described gimbal, or variant thereof.

The components of gimbal ball 20 can be used to establish various levels of rotation. For example, a first level of rotation can be established between gimbal 30 and gimbal 32. Gimbal 30 includes joints 50, and gimbal 32 includes complementary joints 52. Joints 50 and 52 can be configured complementarily for mutual engagement, so that gimbal 30 and gimbal 32 can rotate or pivot relative to one another about a yaw axis Y. Arrow 54 shows the rotational direction of gimbal 30 with reference to yaw axis Y. Such rotation may be referred to as yaw rotation and/or azimuthal rotation. In the illustrated embodiment, gimbal 30 is designed to provide minor (approximately ±4 degrees) rotation about the yaw axis; however, more generally, gimbal 30 may be used to provide any suitable or desired rotation (including a narrower or wider rotation range). Rotation of gimbal 30 can be used to make fine adjustments to the orientation of the payload, while larger adjustments and/or adjustments about a different axis can be made by subsequently described components of the gimbal assembly.

A second level of rotation can be established between gimbal 32 and gimbal 34. Minor-pitch gimbal 32, also referred to as an inner elevation yoke, includes joints 56, and gimbal 34 includes complementary joints 58. Joints 56 and 58 can be configured complementarily for mutual engagement, so that gimbal 32 and gimbal 34 can rotate or pivot relative to one another about a pitch axis P. Arrow 60 shows the rotational direction of gimbal 32 with reference to pitch axis P. Such rotation may be referred to as pitch rotation and/or elevational rotation. Such rotation is translated to gimbal 30 so that a payload mounted to gimbal 30 also rotates about the pitch axis. In the illustrated embodiment, pitch axis P is perpendicular to yaw axis Y by virtue of the relative positioning of joints 52 and 56. As shown in FIG. 8, joints 52 and 56 are not precisely coplanar. In some embodiments, a pitch axis and a yaw axis can be coplanar and/or in some embodiments a pitch axis and a yaw axis can be nonperpendicular. In the illustrated embodiment, gimbal 32 is designed to provide minor (approximately ±4 degrees) rotation about the pitch axis; however, more generally, gimbal 32 may be used to provide any suitable or desired rotation (including a narrower or wider rotation range). Rotation of gimbal 32 can be used to make fine adjustments to the orientation of the payload, while larger adjustments and/or adjustments about a different axis can be made by subsequently described components of the gimbal ball.

A third level of rotation can be established between gimbal 34 and gimbal 36. Major-pitch gimbal 34 includes joints 62 and gimbal 36 includes complementary joints 64. Joints 62 and 64 can be complementarily configured for mutual engagement so that gimbal 34 and gimbal 36 can rotate relative to one another about pitch axis P'. In the illustrated embodiment, pitch axis P' and pitch axis P are substantially equal (i.e., collinear). In other embodiments, for example, pitch axis P' may be parallel to but offset from pitch axis P. Arrow 68 shows the rotational direction of gimbal 34 with reference to pitch axis P'. Such rotation is translated to gimbal 30, via gimbal 32, so that a payload mounted to gimbal 30 also rotates about the pitch axis. In the illustrated embodiment, gimbal 34 is designed to provide major (approximately 38 degrees up and 238 degrees down) rotation about the pitch axis; however, more generally, gimbal 34 may be used to provide any suitable or desired rotation (including a narrower or wider rotation range, in one or both directions). Rotation of gimbal 34 can be used to make course adjustments to the orientation of the payload, while more precise adjustments can be made by rotation of gimbal 32 within gimbal 34.

A fourth level of rotation can be established between gimbal 36 and a support to which the gimbal is coupled, such as a helicopter or other vehicle. Major-yaw gimbal 36 includes a joint 66 configured to rotatably mount to a suitable support. Joint 66 can mount directly to a support or mount indirectly to a support via some intermediate structure. Arrow 69 shows the rotational direction of gimbal 36 with reference to a yaw axis Y'. Yaw axis Y' may be skewed relative to yaw axis Y due to rotation of one or more gimbals about a pitch axis. Rotation of gimbal 36 at joint 66 is translated to gimbal 30, via gimbals 32 and 34, so that a payload mounted to gimbal 30 also rotates about yaw axis Y'. In the illustrated embodiment, gimbal 36 is designed to provide major (continuous 360 degree) rotation about yaw axis Y'; however, more generally, gimbal 36 may be used to provide any suitable or desired rotation (including a narrower rotation range).

The above-described gimbal ball is provided as a nonlimiting example, and other gimbal balls are within in the scope of this disclosure. In particular, gimbal balls with more or fewer constituent gimbals, axes, levels of rotation, etc. can be used, establishing more or fewer levels of rotation. Furthermore, each above-described gimbal is provided as a nonlimiting example. Some gimbal balls may not include a gimbal corresponding to one of the above-described gimbals, some gimbal assemblies may include additional gimbals not described above, and some gimbal assemblies may include modifications of the above-described gimbals.

EXAMPLE 3

Exemplary Space-Saving Gimbals

This example describes exemplary space-saving gimbals, which may be configured to accommodate increased payload capacity and/or to provide a larger payload aperture, as mentioned above; see FIGS. 4-8.

Figure 4:
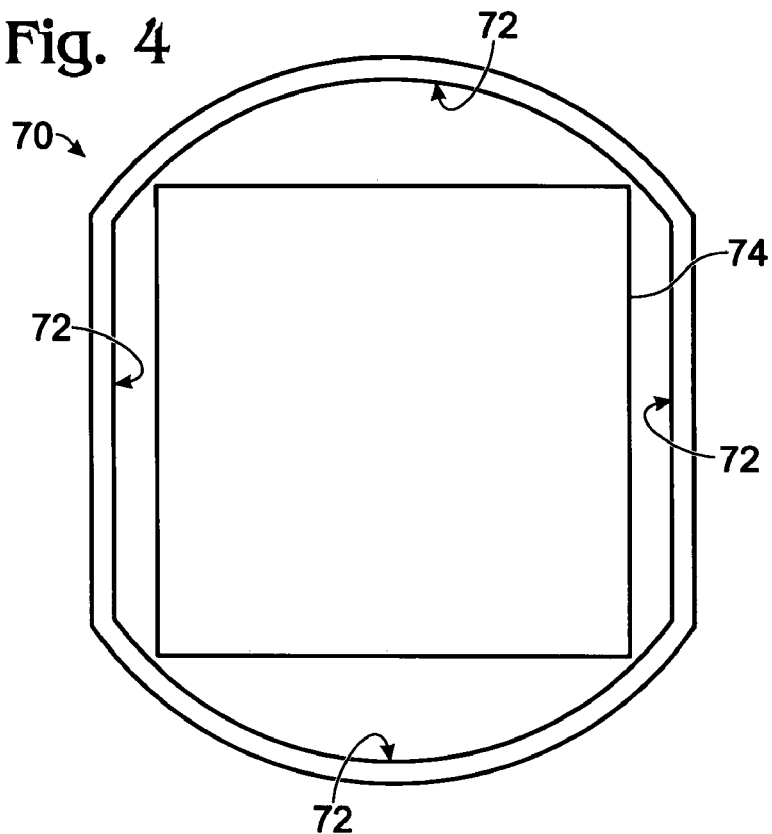
FIGS. 4 and 5 somewhat schematically show two different gimbals that can be incorporated into the gimbal ball of FIG. 3.
Figure 5:
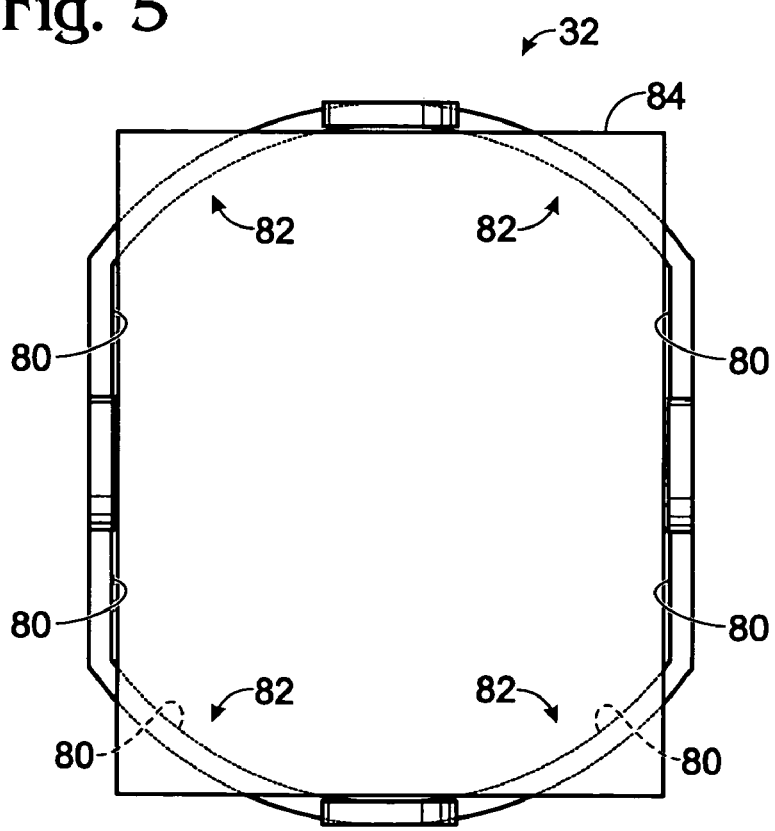

FIGS. 4 and 5 somewhat schematically illustrate two different minor-pitch gimbals, also referred to as inner elevation yokes. In particular, FIG. 4 shows a front view of a gimbal 70 with a substantially continuous sidewall 72. Because sidewall 72 does not include a break, recess, and/or other space-saving feature, a payload effectively is laterally bound by the sidewall, as represented schematically at 74. In contrast, FIG. 5 shows a front view of gimbal 32, which includes a sidewall 80 having space-saving features 82. These space-saving features provide a passage through which a payload can at least partially extend, as represented schematically at 84. In other words, if not for space-saving features 82, the payload could not extend laterally past an inner surface of sidewall 80.

One or more of a variety of different space-saving features may be used to improve payload capacity and/or to provide a larger payload aperture. For example, a gimbal sidewall may include one or more holes or slots through which a payload may at least partially extend. In some embodiments, a gimbal sidewall can include a convexity that effectively increases a volume internal the gimbal sidewall. In some embodiments, a gimbal sidewall may include an open recess through which a payload may at least partially extend. Such exemplary space-saving features, or virtually any other feature that provides increased payload capacity and/or provides a larger payload aperture, can be incorporated individually or collectively into a particular gimbal design.

FIGS. 6 and 7 show axonometric views of gimbal 70 and gimbal 32, respectively. As shown in FIG. 6, gimbal 70 surrounds a payload 90. A substantially continuous sidewall 72 limits the lateral extent to which the payload can extend, thus effectively limiting the total payload capacity of the gimbal. As shown in FIG. 7, gimbal 32 holds a payload 92 that occupies more volume and requires a larger aperture than payload 90. Whereas payload 90 is laterally bound by sidewall 72, payload 92 laterally extends through space-saving features 82 of sidewall 80, thus occupying more space than payload 90. In other words, gimbal 32 can accommodate a more voluminous payload than gimbal 70 because of space-saving features 82. Nonetheless, payload 92 and gimbal 32 do not collectively occupy any more space than payload 90 and gimbal 70 collectively occupy. As can be seen, improvements in payload capacity can be achieved without negatively affecting the overall dimensions of a gimbal assembly. Therefore, for example, either gimbal 70 and payload 90 or gimbal 32 and payload 92 can be fit to operate within gimbal 34 of FIG. 3.

FIG. 8 shows a side-view of minor pitch gimbal 32. Gimbal 32 includes a frame portion 100. Extending forward from the frame portion are protrusions 102 where joints 52 are located and protrusions 104 where joints 56 are located. Protrusions 102 and protrusions 104 collectively define space-saving features in the form of rearwardly extending recesses 82. Recesses 82 can accommodate one or more payload components that extend into the space where the gimbal sidewall would be present if not for the recesses.

The useable space that recesses 82, and/or other space-saving features, provide can be appreciated by comparing gimbal 32 of FIGS. 7 and 8 with gimbal 70 of FIG. 6. As shown in FIG. 8, gimbal 32 includes a front edge 106 that extends to an imaginary plane 110 near joints 52 and 56. The front edge diverges from this plane as it moves farther away from joints 52 and 56, thus creating protrusions that define recesses 82. Recesses 82 can be described as the gap between plane 110 and front edge 106. Such recesses can accommodate payload, thus increasing the payload capacity from that which could be contained laterally interior to the gimbal sidewall if the recesses were not present. In contrast, as can be seen in FIG. 6, a gimbal, such as gimbal 70, typically is configured with a front edge 76 that is substantially planar. Gimbal 70 does not include a recess or other space-saving feature that can accommodate payload. Therefore, an assembly that utilizes a gimbal such as gimbal 70 will not be able to accommodate as voluminous of a payload as can be accommodated by a gimbal assembly that utilizes a gimbal such as gimbal 32.

Recesses 82 of gimbal 32 are provided as a nonlimiting example of a space-saving feature. More generally, gimbals may be designed with recesses having different shapes and sizes, on a recess-by-recess basis. Furthermore, space-saving features other than recesses, such as holes, slots, convexities, etc., can be used instead of, or in addition to, recesses. In the illustrated embodiment, recesses 82 extend rearward from imaginary plane 110 by at least 50% of the depth of gimbal 32. Other embodiments may have deeper or shallower recesses. In general, space-saving features can be sized to achieve a desired balance of payload capacity and structural integrity of the gimbal. In some embodiments, a recess of approximately 10%, 20%, 30%, or 40% may be suitable for accommodating smaller payload components. In other embodiments, a recess of approximately 60%, 70%, 80%, or more may be suitable for accommodating larger payload components. Other space-saving features can be designed to accommodate payload components at different locations of a gimbal. For example, payload components that occupy substantial rearward space can be accommodated by holes near the rear of the gimbal. High-strength materials may be used to form or support a gimbal that includes relatively large recesses or other space-saving features.

EXAMPLE 4

Exemplary Driven Gimbals

This example describes exemplary mechanisms for driving a gimbal ball, or portions thereof; see FIGS. 9-12.

FIG. 9 schematically shows an exemplary gimbal assembly 118, in accordance with aspects of the present teachings. Gimbal assembly 118 includes four constituent gimbals 120, 122, 124, and 126, which correspond to an inner-most layer, a second inner-most layer, a second outer-most layer, and an outer-most layer. The inner layers are nearer the middle of the gimbal assembly, while the outer layers are nearer the periphery of the gimbal assembly. Gimbal assembly 118 also includes a motor 130 that has a first motor component 132 mounted to the inner-most layer, and a complementary second motor component 134 mounted to the second outer-most layer. As described above, the individual gimbals of a gimbal assembly can be configured to move relative to one another about one or more axes. A motor, such as motor 130, can be used to effect such motion. In particular, the first motor component can apply a force to the second motor component, and/or vice versa. The applied force between the two components can cause the components to move relative to one another, thereby causing the gimbals to which the motor components are mounted to move relative to one another.

A motor can be configured to effect motion about a single axis, and two or more motors can be configured cooperatively to effect motion about two different axes, such as about perpendicular axes. When two or more motors are used, one motor can be used to control pitch (rotation of one gimbal relative to another gimbal about a pitch axis), and another motor can be used to control yaw (rotation of one gimbal relative to another gimbal about a yaw axis). In some embodiments, a single motor can be configured to effect motion about two different axes.

The size and disposition of motors used in the gimbal assembly may be selected to increase payload size and driving efficacy. Relatively small motors and/or motors that can be placed at or near the periphery of a gimbal assembly can improve useable payload capacity compared to larger motors and/or motors that are located closer to the center of a gimbal assembly where payload components are typically arranged. Furthermore, because torque is proportional to lever arm (torque ($\tau$)=lever arm (r)×force (F)), a motor can generate relatively more torque as the distance between where the motor applies force and the axis about which the motor causes rotation increases. In other words, the farther the motor acts from an axis of rotation, the less force the motor will have to generate to rotate one gimbal relative to another about that axis.

Figure 10:
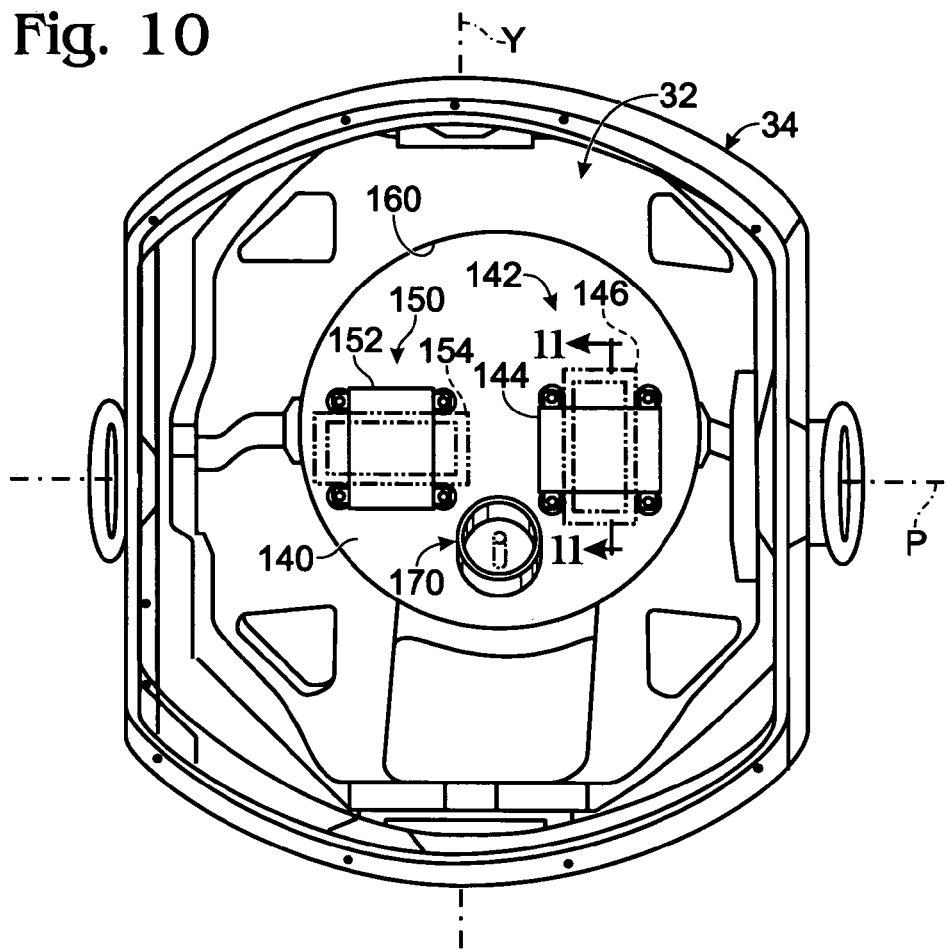
FIG. 10 is a front view of motors peripherally mounted in an exemplary gimbal ball.

FIG. 10 shows aspects of an exemplary driver system, for example, suitable for the gimbal assembly of FIG. 3. FIG. 10 shows a front view of gimbal 32 mounted to major pitch gimbal 34. FIG. 10 also shows a shell 140 connected to gimbal 34 and configured to partially encase gimbal 32 from behind. Shell 140 also can partially encase gimbal 30 and/or associated payload when gimbal 30 and the payload are assembled as shown at 42 of FIG. 3. Shell 140, in particular, its inside surface, also provides a motor mounting location near the periphery of a gimbal assembly. FIG. 10 also shows a fine-pitch motor 142 that includes a stator 144 mounted to gimbal 34 via shell 140. The fine-pitch motor also includes a complementary rotor 146, drawn in dashed lines, that is mounted to gimbal 30 via a mounting assembly. FIG. 10 also shows a fine-yaw motor 150 that includes a stator 152 mounted to gimbal 34 via shell 140. The fine-yaw motor also includes a complementary rotor 154, drawn in dashed lines, that is mounted to gimbal 30 via a mounting assembly. In the illustrated embodiment, fine-pitch motor 142 is configured to control relative movement between stator 144 and rotor 146 about pitch axis P, and fine-yaw motor 150 is configured to control relative movement between stator 152 and rotor 154 about yaw axis Y. In this manner, motor 142 and motor 150 can cooperate to make fine adjustments to the pitch and yaw of a payload mounted to gimbal 30.

Figure 11:
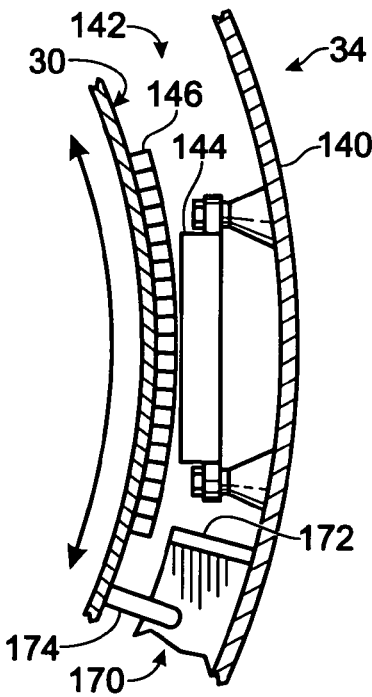
FIGS. 11 and 12 are side-views of one of the motors of FIG. 10.
Figure 12:
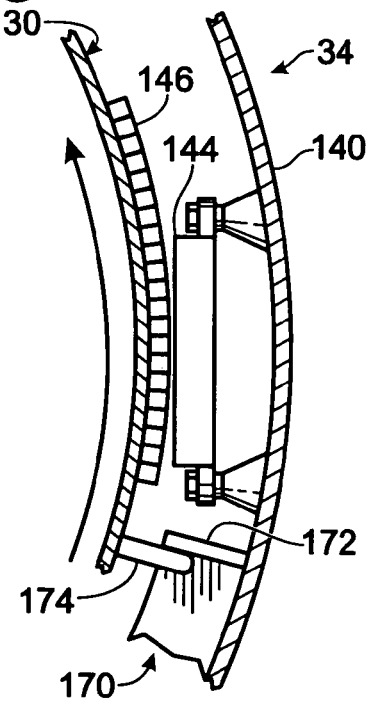

FIGS. 11 and 12 show a more detailed side-view of fine-pitch motor 142. Rotor 146 can move in an arc about a pitch axis. Although rotor 146 moves in an arc as gimbal 30 rotates relative to gimbal 34 and shell 140, a linear motor can be used to effect the motion. The gimbals can be configured to guide the rotor in an arc when a linear force is applied between the stator and the rotor, thus allowing a linear motor to be used.

The driver(s) used in gimbal balls, as described herein, generally comprise any mechanism for effecting a suitable or desired force (and/or torque). Exemplary drivers may include linear motors, rotary motors, stepper motors, servo motors, brushed motors, brushless motors, DC motors, AC motors, limited angle motors, and so on. These motors may be mixed or matched as desired or appropriate. A nonlimiting example of a linear motor is a linear electric motor, which utilizes magnetic forces to effect movement between a rotor and a stator. A linear electric motor is essentially an electric motor that has been "unrolled" so that instead of producing a torque, it produces a linear force by setting up an electromagnetic field. Linear motors can be induction motors or stepper motors, among others. In the illustrated embodiment, stator 144 includes a magnet, and rotor 146 includes a coil through which an electric current can be directed, thus generating a magnetic field. The current can be controlled so as to generate a desired magnetic field, thus controlling the linear forces between the stator and the rotor.

In the illustrated embodiment, two motors are used to control fine adjustments. Motor 142 controls fine elevational adjustments, while motor 150 controls fine azimuthal adjustments. Both motors include a component mounted to an outer layer of the gimbal ball, namely gimbal 34 via shell 140 and/or associated mounting structure. The shell extends to the far periphery of the gimbal ball. Both motors also include corresponding components mounted to an inner layer of the gimbal ball, namely gimbal 30. In some embodiments, motor components can be mounted to gimbal 30 via a mounting structure. One or more gimbals can be operatively interposed between the gimbals that support the motor components. For example, in FIG. 10, gimbal 32 is interposed between gimbal 34 and gimbal 30. Rotors 146 and 154 extend through an opening 160 of gimbal 32. In this manner, the motor can be spaced distal an axis about which the motor is to cause rotation. The distance between such an axis and the motor can be 70%, 80%, 90%, or even equal to or greater than 95% of the distance between the axis and the outer-most surface of the gimbal ball directly behind the motor.

Motor 142 is positioned proximate motor 150, as shown. Positioning the motors near each other obviates the need to design or maintain two separate locations for distally spaced motors. Adjacent motors can facilitate a greater overall payload capacity than distally spaced motors. Moreover, such proximate positioning also can allow power and control wires to be run alongside one another and otherwise simplify assembly and/or maintenance.

FIGS. 10-12 also show a rotational restrictor 170, including a fence 172 and a peg 174 interior the fence. Rotational restrictor 170 effectively limits fine-rotation about the yaw and the pitch axis. The rotational restrictor can be designed so that, as the motors control fine movement between the gimbals, peg 174 moves within fence 172. However, the fence prevents the peg from moving more than a predetermined distance in any direction. The size and shape of fence 172 can be set to restrictively engage peg 174 when the payload has been rotated a predetermined amount. In the illustrated embodiment, the fence is generally circularly shaped, although this is not required. Fences having a circular shape can allow for substantially equal-magnitude rotation in any direction. Conversely, fences having other shapes can be used to allow for different amounts of rotation. For example, an oval fence can be used to allow greater rotation about a pitch axis than about a yaw axis, or vice versa, depending on the orientation of the oval fence. Furthermore, in the illustrated embodiment, the fence is sized to allow approximately 4 degrees of rotation in all directions. A larger fence can be used to allow more rotation, while a smaller fence can be used to allow less rotation.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A gimbal ball, comprising:
    an inner gimbal;
    first and second inner driver components mounted to the inner gimbal;
    an intermediate gimbal rotatably connected around the inner gimbal;
    an outer gimbal rotatably connected around the intermediate gimbal; and
    first and second outer driver components mounted to the outer gimbal, each outer driver component extending at least partially through an opening of the intermediate gimbal to operatively connect to one of the inner driver components;
    wherein the first inner and first outer driver components are collectively configured to rotate the inner gimbal relative to the outer gimbal about a first axis while leaving the intermediate gimbal in a fixed orientation, and the second inner and second outer driver components are collectively configured to rotate the inner gimbal relative to the outer gimbal about a second axis while leaving the intermediate gimbal in a fixed orientation.

2. The gimbal ball of claim 1, wherein the first outer driver component and the second outer driver component extend through the same opening of the intermediate gimbal.

3. The gimbal ball of claim 2, wherein the first and second inner driver components are attached to a common inner mounting structure of the inner gimbal, and the first and second outer driver components are attached to a common outer mounting structure of the outer gimbal.

4. The gimbal ball of claim 1, wherein the first outer driver component extends through a first opening of the intermediate gimbal, and the second outer driver component extends through a second opening of the intermediate gimbal.

5. A gimbal ball, comprising:
    an inner gimbal;
    first and second inner driver components mounted to the inner gimbal;
    an intermediate gimbal rotatably connected around the inner gimbal;
    an outer gimbal rotatably connected around the intermediate gimbal; and
    first and second outer driver components mounted to the outer gimbal;
    wherein each inner driver component extends at least partially through an opening of the intermediate gimbal to operatively connect to one of the outer driver components;
    wherein the first inner and first outer driver components are collectively configured to rotate the inner gimbal relative to the outer gimbal about a first axis while leaving the intermediate gimbal in a fixed orientation, and the second inner and second outer driver components are collectively configured to rotate the inner gimbal relative to the outer gimbal about a second axis while leaving the intermediate gimbal in a fixed orientation.

6. The gimbal ball of claim 5, wherein the first inner driver component and the second inner driver component extend through the same opening of the intermediate gimbal.

7. The gimbal ball of claim 5, wherein the first and second inner driver components are attached to a common inner mounting structure of the inner gimbal, and the first and second outer driver components are attached to a common outer mounting structure of the outer gimbal.

8. The gimbal ball of claim 5, wherein the first inner driver component extends through a first opening of the intermediate gimbal, and the second inner driver component extends through a second opening of the intermediate gimbal.

* * * * *